(12) United States Patent
Martin et al.

(10) Patent No.: US 9,415,769 B2
(45) Date of Patent: Aug. 16, 2016

(54) SYSTEM AND METHOD FOR CONTROLLING A POWERTRAIN IN A VEHICLE

(71) Applicant: Ford Global Technologies, LLC, Dearborn, MI (US)

(72) Inventors: Douglas Raymond Martin, Canton, MI (US); Paul Stephen Bryan, Belleville, MI (US); Mohamad Mansour, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/496,656

(22) Filed: Sep. 25, 2014

(65) Prior Publication Data

US 2016/0090075 A1    Mar. 31, 2016

(51) Int. Cl.
| | |
|---|---|
| *G06F 7/00* | (2006.01) |
| *B60W 20/00* | (2016.01) |
| *B60W 10/06* | (2006.01) |
| *B60W 10/08* | (2006.01) |

(52) U.S. Cl.
CPC ............ *B60W 20/106* (2013.01); *B60W 10/06* (2013.01); *B60W 10/08* (2013.01); *B60W 2510/244* (2013.01); *B60W 2540/10* (2013.01); *B60W 2710/0644* (2013.01); *B60W 2710/086* (2013.01); *Y10S 903/93* (2013.01)

(58) Field of Classification Search
CPC ... B60W 20/106; B60W 10/06; B60W 10/08; B60W 2510/244; B60W 2540/10; B60W 2710/086; Y10S 903/93
USPC .......................................................... 701/22
See application file for complete search history.

(56) References Cited

U.S. PATENT DOCUMENTS

| | | | |
|---|---|---|---|
| 7,328,091 B2 * | 2/2008 | Kimura ................. | B60K 6/365 180/65.1 |
| 7,490,000 B2 | 2/2009 | Siddiqui et al. | |
| 7,632,212 B2 | 12/2009 | Yamanaka et al. | |
| 7,812,468 B2 * | 10/2010 | Kuroda ................. | H02P 9/102 290/40 C |
| 8,195,350 B2 | 6/2012 | Jinno | |
| 8,583,301 B2 | 11/2013 | Okubo et al. | |
| 2010/0063658 A1 * | 3/2010 | Martin ................. | B60K 6/365 701/22 |

* cited by examiner

*Primary Examiner* — Ian Jen
(74) *Attorney, Agent, or Firm* — David B. Kelley; Brooks Kushman P.C.

(57) ABSTRACT

A system and method for controlling a powertrain in a vehicle includes controlling a speed of an engine in the vehicle using a first engine speed control when an accelerator pedal position is less than a first predetermined position and a battery discharge limit of a battery in the vehicle is at least a predetermined discharge limit. The speed of the engine is controlled using a second engine speed control different from the first engine speed control when the accelerator pedal position is less than the first predetermined position and the battery discharge limit is less than the predetermined discharge limit.

12 Claims, 2 Drawing Sheets and
SYSTEM AND METHOD FOR CONTROLLING A POWERTRAIN IN A VEHICLE

TECHNICAL FIELD

The present invention relates to a system and method for controlling a powertrain in a vehicle.

BACKGROUND

Fuel economy is a priority for customers of hybrid electric vehicles (HEV's). This may especially be true when the vehicle is operating in an "Eco-Mode", which may be considered an "economy mode" or "ecology mode" since a goal of this mode of operation is to reduce fuel consumption. In some vehicles, the Eco-Mode may be manually selected by the vehicle operator. Implementing an engine speed control strategy that delivers engine power at all accelerator pedal positions may allow the engine to operate at very inefficient points—e.g., at or near the maximum allowable speed. If, however, the accelerator pedal position is at or near the wide open pedal (WOP) position, it may be desirable to deliver maximum power regardless of efficiency; this may require the engine speed control strategy to allow the engine to operate at or near the maximum allowable speed. At positions other than WOP, however, it would be desirable to have a system and method for controlling the vehicle powertrain more efficiently.

SUMMARY

Embodiments of the present invention may include a method for controlling a powertrain in a vehicle that includes controlling a speed of an engine in the vehicle using a first engine speed control when an accelerator pedal position is less than a first predetermined position and a battery discharge limit of a battery in the vehicle is at least a predetermined discharge limit. The method may also include controlling the speed of the engine using a second engine speed control different from the first engine speed control when the accelerator pedal position is less than the first predetermined position and the battery discharge limit is less than the predetermined discharge limit.

Embodiments of the present invention may include a method for controlling a powertrain in a vehicle that includes limiting engine speed to a first predetermined speed when a battery discharge limit is at least a predetermined discharge limit and an accelerator pedal position is less than a first predetermined position. The method may also include allowing the engine speed to exceed the first predetermined speed when the battery discharge limit is below the predetermined discharge limit and the accelerator pedal position is less than the predetermined position.

Embodiments of the present invention may include a system for controlling a powertrain in a vehicle that includes a control system including at least one controller configured to perform the following when an accelerator pedal position is less than a first predetermined position: limit engine speed to a predetermined speed when a battery discharge limit is at least a predetermined discharge limit and allow the engine speed to exceed the predetermined speed when the battery discharge limit is below the predetermined discharge limit.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
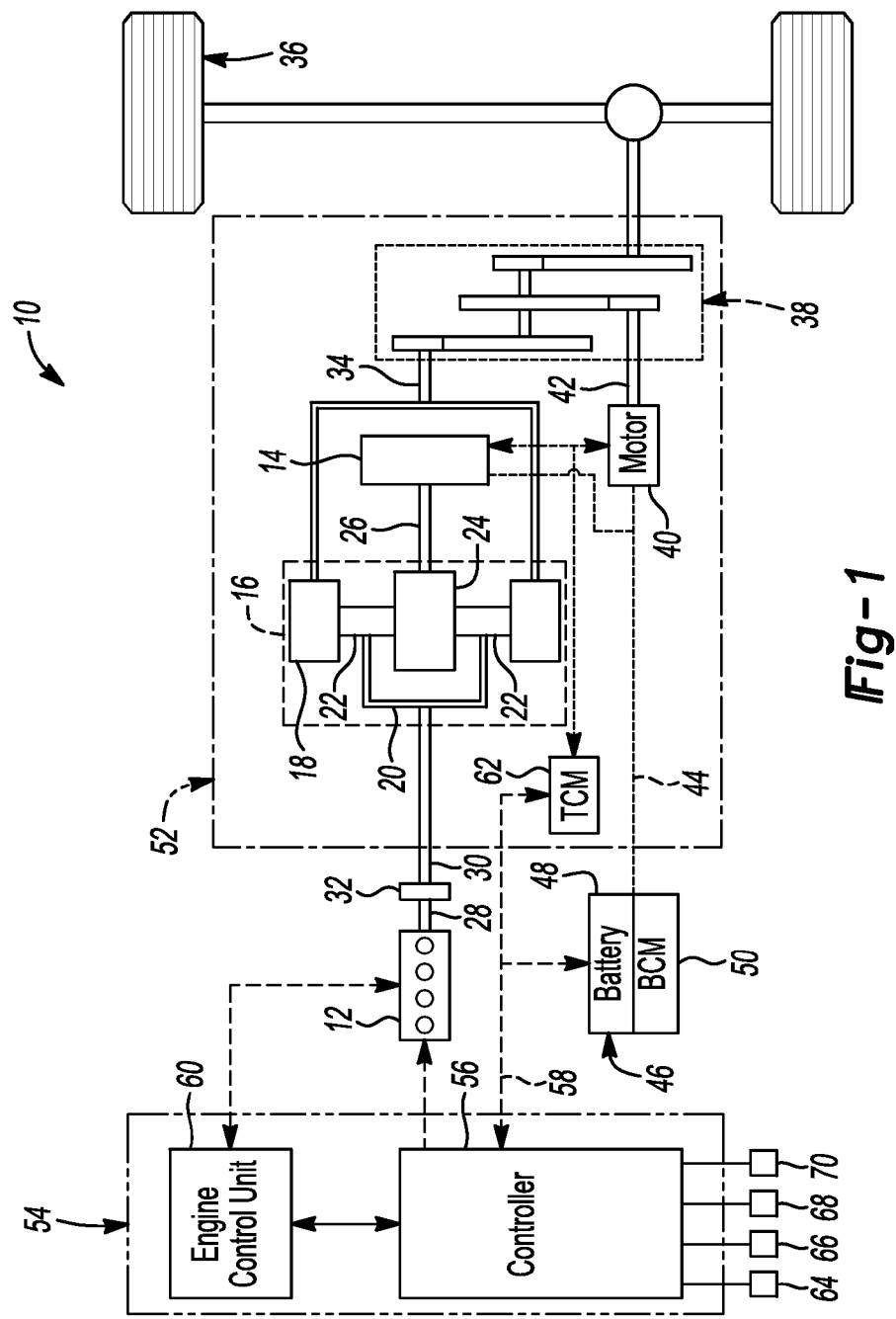
FIG. 1 shows a hybrid electric vehicle (HEV) powertrain in accordance with embodiments of the present invention.

Referring now to the drawings, FIG. 1 is a schematic representation of a vehicle 10, which may include an engine 12 and an electric machine, or generator 14. The engine 12 and the generator 14 may be connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also output torque to a shaft 26 connected to the sun gear 24. Similarly, the engine 12 can output torque to a crankshaft 28, which may be connected to a shaft 30 through a passive clutch 32. The clutch 32 may provide protection against over-torque conditions. The shaft 30 may be connected to the carrier 20 of the planetary gear arrangement 16, and the ring gear 18 may be connected to a shaft 34, which may be connected to a first set of vehicle drive wheels, or primary drive wheels 36 through a gear set 38.

The vehicle 10 may include a second electric machine, or motor 40, which can be used to output torque to a shaft 42 connected to the gear set 38. Other vehicles within the scope of the present application may have different electric machine arrangements, such as more or fewer than two electric machines. In the embodiment shown in FIG. 1, the electric machine arrangement—i.e., the motor 40 and the generator 14—can both be used as motors to output torque. Alternatively, each can also be used as a generator, outputting electrical power to a high voltage bus 44 and to an energy storage system 46, which may include a battery pack 48 and a battery control module (BCM) 50.

The battery 48 may be a high voltage battery that is capable of outputting electrical power to operate the motor 40 and the generator 14. The BCM 50 may act as a controller for the battery 48. Other types of energy storage systems can be used with a vehicle, such as the vehicle 10. For example, a device such as a capacitor can be used, which like a high voltage battery is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. Although depicted as a powersplit device in FIG. 1, other HEV powertrain configurations may be employed, such as parallel or series HEVs. Such powertrains may include engines, transmissions and drive wheels, such as the engine 12, transmission 52 and drive wheels 36 depicted in FIG. 1, or may include different components depending on the configuration. To control the engine 12 and components of the transmission 52—e.g., the generator 14 and motor 40—a vehicle control module 54, such as a powertrain control module (PCM), may be provided. The control module 54 may include a vehicle system controller (VSC), shown generally as controller 56. Although it is shown as a single controller, the controller 56 may include controllers that may be used to control multiple vehicle systems. The control module 54, and other control modules and controllers in the vehicle 10, may include one or more processors, and may include both software embedded within the controllers and/or separate hardware to control various vehicle systems.

A controller area network (CAN) 58 may allow the controller 56 to communicate with the transmission 52 and the BCM 50. Just as the battery 48 includes a BCM 50, other devices controlled by the controller 56 may have their own controllers. For example, an engine control unit (ECU) 60 may communicate with the controller 56 and may perform control functions on the engine 12. In addition, the transmission 52 may include a transmission control module (TCM) 62, configured to coordinate control of specific components within the transmission 52, such as the generator 14 and/or the motor 40. Some or all of these various controllers can make up a control system in accordance with the present application. Although illustrated and described in the context of the vehicle 10, which is a HEV, it is understood that embodiments of the present application may be implemented on other types of vehicles, such as a plug-in hybrid electric vehicles (PHEV).

Also shown in FIG. 1 are simplified schematic representations of a braking system 64, an accelerator pedal 66, and a gear shifter 68. The braking system 64 may include such things as a brake pedal, position sensors, pressure sensors, or some combination thereof (not shown) as well as a mechanical connection to the vehicle wheels, such as the wheels 36, to effect friction braking. The braking system 64 may also include a regenerative braking system, wherein braking energy is captured and stored as electrical energy in the battery 48. Similarly, the accelerator pedal 66 may include one or more sensors, which like the sensors in the braking system 64, may communicate information to the controller 56, such as accelerator pedal position. The gear shifter 68 may also communicate with the controller 56. For instance, the gear shifter may include one or more sensors for communicating the gear shifter position to the controller 56.

The engine 12 may be the sole power source in an HEV, such as vehicle 10. The battery 48 can, however, operate as an energy storage device. For instance, the battery 48 may store power from the engine 12 that has been converted into electricity by the generator 14. Further, the vehicle's kinetic energy may be transformed into electrical energy by the motor 40 during braking and stored in the battery 48. The vehicle 10 may have two sources of motive force or power: the engine 12 and the battery 48. The engine 12 may provide mechanical energy to a driveline via reaction torque provided by the generator 14. The battery 48 may provide electrical energy to the driveline through the motor 40.

The vehicle 10 may also include a switch 70 operable by the vehicle driver to place the vehicle 10 in an Eco-Mode. Although different vehicles may provide different operating strategies for Eco-Mode operation, in at least some Eco-Modes, the vehicle may be controlled to sacrifice performance to achieve greater fuel economy. For example, a speed of response to an accelerator pedal change may be reduced in an Eco-Mode. Similarly, an Eco-Mode may allow a greater level of noise, vibration, and harshness (NVH) than would otherwise be allowed in a non-Eco-mode. Other aspects of an Eco-Mode strategy may include limiting climate control functions, modifying a cruise control program, or some combination of the above. As noted above, while the driver is operating the vehicle in Eco-Mode, it is expected that fuel economy will be improved over a standard control strategy. Therefore, to improve fuel economy, particularly when a vehicle is operating in an Eco-Mode, embodiments of the present invention may implement some or all of the strategies described in conjunction with FIGS. 2 and 3, which may be implemented by a control system in the vehicle 10, consisting of one or more of the controllers described above.

Figure 2:
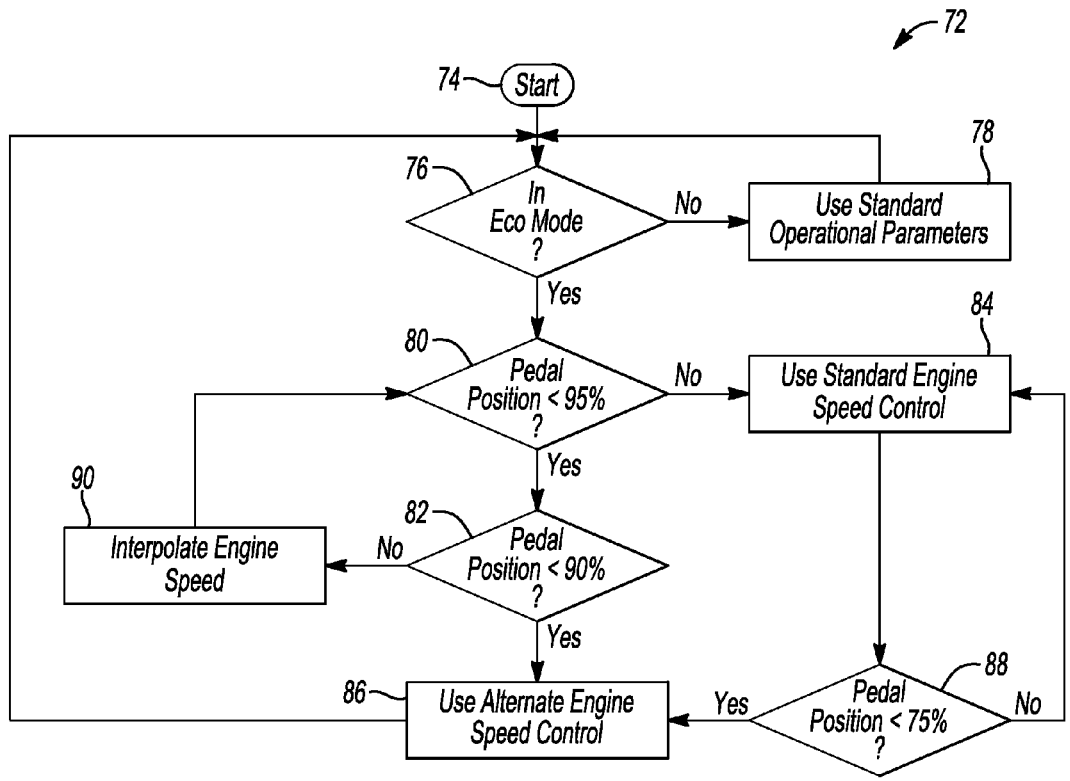
FIG. 2 shows a flowchart illustrating a method in accordance with embodiments of the present invention.

FIG. 2 shows a flowchart 72 illustrating a method in accordance with embodiments of the present invention. For reference, the vehicle 10 and its various components illustrated in FIG. 1 and described above may be used in conjunction with the description of some of the steps of the flowchart 72. The method starts at step 74, and then goes to decision block 76, where it is determined whether the vehicle 10 is in an Eco-Mode. As described above, the switch 70 may be actuated to place the vehicle 10 in an Eco-Mode. It is worth noting, however, that other vehicles may enter an Eco-Mode automatically, without operator input. For example, a control system may be programmed to receive various inputs related to operation of the vehicle—e.g., driver pedal inputs, inputs related to external conditions such as terrain, the status of various subsystems such as environmental control systems, energy storage systems, etc.—and the control system may compare these inputs to a set of preprogrammed conditions under which the control system will automatically place the vehicle in an Eco-Mode.

Returning now to FIG. 2, it is shown that if it is determined at decision block 76 that the vehicle is not in Eco-Mode, standard operational parameters will be used to control the powertrain—see block 78. As used herein, the term "powertrain" includes those elements of the vehicle 10 which generate or transmit power to the wheels 36—e.g., the engine 12, the transmission 52, and the various connecting shafts and linkages associated with them. In addition, control of a powertrain does not require that a control strategy act on every element of a powertrain. The use of standard operational parameters as indicated in step 78 includes whatever powertrain control programming the vehicle 10 uses when it is not an Eco-Mode. This may include, for example, allowing the speed of the engine 12 to be entirely dictated by a position of the accelerator pedal 66. Under certain operating conditions—e.g., cruise control—the engine speed may be controlled differently than under other operating conditions, but the operational parameters will not be those used during the more fuel economy oriented Eco-Mode.

If it is determined at decision block 76 that the vehicle 10 is in an Eco-Mode, the method then moves to decision block 80. At decision block 80 it is determined whether a position of the accelerator pedal 66 is less than 95% of its maximum pedal travel. Although a value of 95% is used in the embodiment illustrated in FIG. 2, different values of an accelerator pedal position can be used in this step, and therefore, in general, decision block 80 determines whether the accelerator pedal position is less than a predetermined position. As used herein, the position of an accelerator pedal, such as the accelerator pedal 66, may be referred to as being "less than" a certain position, "greater than" a certain position, or "at least" a certain position. This merely refers to how far the accelerator pedal is open as compared to a reference position. As known to those skilled in the art, pedal positions can be referred to in terms of a percentage of a fully open position, a certain number of "counts", or an angle of the accelerator pedal relative to some reference position, just to name a few.

If it is determined at decision block 80 that the accelerator pedal position is less than the predetermined position—95% in this embodiment—the method moves to step 82, where it is determined whether the accelerator pedal position is less than 90% of its fully open position. Similar to the step at decision block 80, the determination at decision block 82 may use a value of an accelerator pedal position other than 90%. For purposes of generalization, the determination at decision block 82 will be referred to as a determination as to whether the accelerator pedal position is less than a "first predetermined position", while the decision at block 80 will be referred to as a determination as to whether the accelerator pedal position is less than a "second predetermined position".

If it is determined at decision block 80 that the accelerator pedal position is not less than the second predetermined position, the method moves to step 84 where standard engine speed control strategies are used to control the speed of the engine 12. It is worth noting that although step 84 refers to standard "engine speed controls", and described below are a number of other "engine speed controls", these controls are really systems and methods for controlling the vehicle powertrain, and they may include the control of components other than the engine—for example, a traction motor. As described above, using standard engine speed control strategies may not provide a level of desired fuel economy, especially when the vehicle is operating in an Eco-Mode; however, at step 80 it was determined that the accelerator pedal was at, or nearly at, a wide-open pedal position. When the driver actuates an accelerator pedal to this position, it is considered that a maximum amount of power is required; therefore, embodiments of the present invention may allow the engine speed to be controlled as though the vehicle were not in an Eco-Mode so as to help ensure that the required power is available to the driver. It is therefore assumed that the second predetermined position, although it may not be 95%, will be near a WOP position.

Returning now to decision block 82, where it is determined whether the accelerator pedal position is less than a first predetermined position, it is shown that the method moves to step 86 if the accelerator pedal position is less than the first predetermined position. At step 86, an alternative engine speed control is used. In general, the term "alternative" as used here merely indicates that one or more speed control strategies may be employed that are different from a standard engine speed control, such as, for example, used in step 84. One form of alternative engine speed control used by at least some embodiments of the present invention includes controlling the speed of an engine using a first engine speed control if, in addition to the accelerator pedal position being less than the first predetermined position, a battery discharge limit of a battery, such as the battery 48, is at least a predetermined discharge limit.

In at least some embodiments, the first engine speed control may include limiting the engine speed to a first predetermined speed—i.e., ensuring that the engine speed does not exceed a predetermined limit, regardless of driver demand. Of course, it has already been determined that the accelerator pedal position is less than the first predetermined position, and therefore this approach would not inhibit a higher engine speed at WOP. In the first engine speed control, the motor 40 may be operated to provide power to augment power provided by the engine 12, which may be caused by the speed control limit imposed on the engine 12. In at least some embodiments of the present invention, an engine speed of 4500 RPM may be used as the first predetermined speed for purposes of the first engine speed control. The additional requirement of ensuring that the battery discharge limit is at least a predetermined discharge limit helps to ensure that the motor 40 will be available to augment the engine power if the limitations imposed on the engine 12 by the control strategy keep it from providing a desired amount of power. In at least some embodiments of the present invention, a battery discharge limit of 34 kW may be used as the predetermined discharge limit, below which the first engine speed control will not be used.

Another form of alternative speed control used by at least some embodiments of the present invention and indicated at step 86 is a second engine speed control, which, like the first engine speed control, is implemented when the accelerator pedal position is less than the first predetermined position; however, the second engine speed control is implemented when the battery discharge limit is less than the predetermined discharge limit. Because the second engine speed control is implemented when the battery discharge limit is less than the predetermined discharge limit, it is assumed that the battery may not be able to supply enough power to a traction motor, such as the motor 40, to augment the engine power if the engine speed is limited as it was in the first engine speed control. Therefore, in the second engine speed control, use of the motor may be inhibited and the engine speed allowed to exceed the first predetermined speed when necessary to provide a desired amount of power. This is described in more detail below in conjunction with FIG. 3.

Returning to step 84, where standard engine speed control strategies are used, the engine speed control may be conveniently referred to as a third engine speed control, to differentiate it from the alternative engine speed controls described in conjunction with step 86. Because one of the criteria necessary for the third engine speed control to be implemented is that the accelerator pedal position is at or near WOP, the third engine speed control allows the speed of the engine to reach a maximum allowable engine speed. The maximum allowable engine speed may be determined by an engine or vehicle manufacturer, and it may be a calibratable value which could be modified from an original value. For at least some engines in some vehicles, a value of approximately 6000 RPM may be considered a maximum allowable engine speed. Because fuel economy suffers at such high engine speeds, the third engine speed control may be configured to maintain engine speed at a second predetermined speed somewhat below the maximum allowable speed for some period of time prior to allowing the engine to reach the maximum allowable speed.

Stated another way, the vehicle operator, even when operating the accelerator pedal at WOP, may be required to maintain the accelerator pedal position at or above the second predetermined position for some period of time before the engine is allowed to reach its maximum allowable speed. In at least some embodiments of the present invention, the third engine speed control may control the engine to a second predetermined speed of 5300 RPM, and may require the accelerator pedal to be at WOP for a predetermined time of 6 seconds before allowing the engine to reach the maximum allowable speed of 6000 RPM.

Because accelerator pedal positions can change fairly rapidly, and because the first and second predetermined positions indicated at steps 82 and 80, respectively, may be relatively close to one another, it may be desirable to build in a hysteresis to at least some embodiments of the control strategies described herein. Specifically, it would be undesirable to quickly alternate back and forth between the standard engine speed control as indicated in step 84 and the alternative engine speed controls indicated at step 86; at a minimum, fuel economy would likely suffer. Therefore, at least some embodiments of the present invention may use a hysteresis loop such as indicated in FIG. 2. Specifically, once the third engine speed control is implemented at step 84, the method moves to step 88 to determine whether the accelerator pedal position is less than a third predetermined pedal position, which is lower than the first predetermined pedal position indicated at step 82. In the embodiment shown in FIG. 2, the third predetermined position is 75%.

If the decision is made at step 88 that the accelerator pedal position is not below the third predetermined position, the method loops back to step 84 and use of the standard engine speed control is maintained. If, however, it is determined at step 88 that the accelerator pedal position is less than the third predetermined position, the method then moves to step 86. Because it is already known that the accelerator pedal position is less than the first predetermined position—as noted above the third predetermined position used at step 88 is by definition less than the first predetermined position used in step 82—the control strategy then looks to the battery discharge limit to see if it is at least the predetermined discharge limit. If it is, the first engine speed control is implemented; if it is not, the second engine speed control is implemented.

Returning to decision block 82, it is shown that if a determination is made that the accelerator pedal position is not less than the first predetermined position—in this embodiment 90%—the method moves to step 90 where engine speed is interpolated; this may be conveniently referred to as a fourth engine speed control. Because of the decisions at steps 80 and 82, it is known that the accelerator pedal position is between the first and second predetermined positions. Therefore, the accelerator pedal position is not at WOP, but may be headed toward WOP as the driver continues to accelerate. In order to help ensure that there is not an abrupt change in engine speed as the control strategy changes from the speed control limitation imposed by the first engine speed control the maximum allowable engine speed as allowed at step 84, embodiments of the present invention may use a transition area where engine speed is interpolated between two values as indicated at step 90.

To the extent that the vehicle is currently being operated under standard operational parameters, such as indicated at step 78, or it is being operated under a standard engine speed control or a second engine speed control, such as indicated at steps 84 and 86, the interpolation step shown at step 90 may not be necessary because of the reduced likelihood of an abrupt change in engine speed if the accelerator pedal position is moved to WOP. Therefore, in the embodiment illustrated in FIG. 2, the interpolation of engine speed at step 90 is implemented only when the engine is being controlled by the first engine speed control—i.e., it is being limited to the first predetermined speed. Although different forms of interpolation may be used, one method controls the engine speed between the first and second predetermined speeds based on the accelerator pedal position relative to the first and second predetermined positions. Stated another way, and using the actual numbers in the example provided above, if the accelerator pedal position is at 92%, the engine speed will be set to a speed ⅖ of the way between 4500 RPM and 5300 RPM, since this is ⅖ of the way between 90% and 95%. If the accelerator pedal position increases toward the second predetermined position of 95%, the engine speed will increase linearly. The present invention also contemplates other types of speed control for this transition area, which may be non-linear.

Figure 3:
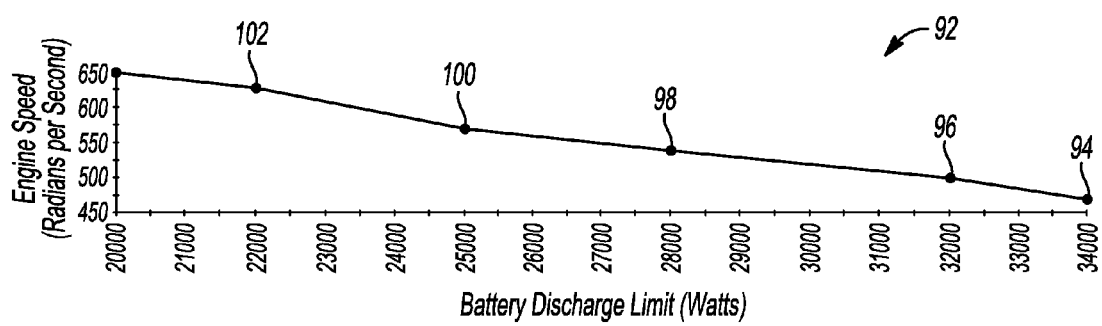
FIG. 3 shows a graph illustrating a relationship between a battery discharge limit and engine speed in accordance with embodiments of the present invention.

Turning now to FIG. 3, a graph 92 is shown indicating the relationship between engine speed and battery discharge limit when the powertrain is being controlled with the second engine speed control. As described above, the second engine speed control is used when the accelerator pedal position is less than the first predetermined position, but the battery discharge limit is below the predetermined discharge limit. Using the example from above, the predetermined discharge limit is 34 kW, as indicated on the far right side of the graph 92. Specifically, at point 94 the battery discharge limit is 34 kW and the engine speed is approximately 471 radians per second. Because there are approximately 9.5 RPM's in one radian per second, the engine speed at point 94 is approximately 4500 RPM. This correlates to where the first engine speed control ends and the second engine speed control takes over.

FIG. 3 shows that as the battery discharge limit decreases, the speed at which the engine is allowed to operate increases. One way to view this control is as though the first predetermined speed used in the first engine speed control is allowed to increase as a function of battery discharge limit. Thus, the engine speed increases throughout the points 96, 98, 100, until reaching the maximum allowable speed at point 102, where the engine speed is approximately 6000 RPM (628 radians per second). Although the graph 92 shows the engine speed increasing beyond point 102, the actual engine speed may be limited to 6000 RPM as described above. Allowing the engine speed to increase above the first predetermined speed in the second engine speed control strategy as indicated in FIG. 3, helps to ensure that the motor will not be operated to augment engine power if it would cause the battery to be discharged beyond a desirable level.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a vehicle powertrain, comprising:
    limiting engine speed to a first predetermined speed when a battery discharge limit is at least a predetermined discharge limit and an accelerator pedal position is less than a first predetermined position; and
    allowing the engine speed to exceed the first predetermined speed when the battery discharge limit is below the predetermined discharge limit and the accelerator pedal position is less than the first predetermined position.

2. The method of claim 1, further comprising allowing the engine speed to reach a maximum allowable engine speed when the accelerator pedal position is at least a second predetermined position, the second predetermined position being greater than the first predetermined position.

3. The method of claim 2, further comprising maintaining the engine speed at a second predetermined speed for a predetermined time before allowing the engine speed to reach the maximum allowable engine speed.

4. The method of claim 3, further comprising operating the engine at a speed between the first and second predetermined speeds based on the accelerator pedal position relative to the first and second predetermined positions, when the accelerator pedal position is between the first and second predetermined positions.

5. The method of claim 2, further comprising operating a motor in the vehicle to provide power to augment power provided by the engine when the engine is limited to the first predetermined speed.

6. The method of claim 5, further comprising limiting the engine speed to the first predetermined speed and operating the motor to provide power to augment power provided by the engine when the accelerator pedal position decreases from a position greater than the second predetermined position to a position less than a third predetermined position which is lower than the first predetermined position and the battery discharge limit is at least the predetermined discharge limit.

7. A system for controlling a powertrain in a vehicle, comprising:
- a control system including at least one controller configured to perform the following when an accelerator pedal position is less than a first predetermined position: limit engine speed to a predetermined speed when a battery discharge limit is at least a predetermined discharge limit and allow the engine speed to exceed the predetermined speed when the battery discharge limit is below the predetermined discharge limit.

8. The system of claim 7, wherein the control system is further configured to operate a motor in the vehicle to provide power to augment power provided by the engine when the engine is limited to the predetermined speed.

9. The system of claim 8, wherein the control system is further configured to allow the engine speed to reach a maximum allowable engine speed when the accelerator pedal position is at least a second predetermined position, the second predetermined position being greater than the first predetermined position.

10. The system of claim 9, wherein the predetermined speed is a first predetermined speed, and the control system is further configured to maintain the engine speed at a second predetermined speed higher than the first predetermined speed for a predetermined time before allowing the engine speed to reach the maximum allowable engine speed.

11. The system of claim 10, wherein the control system is further configured to operate the engine at a speed between the first and second predetermined speeds based on the accelerator pedal position relative to the first and second predetermined positions, when the accelerator pedal position is between the first and second predetermined positions.

12. The system of claim 10, wherein the control system is further configured to limit the engine speed to the first predetermined speed and operate the motor to provide power to augment power provided by the engine when the accelerator pedal position decreases from a position greater than the second predetermined position to a position less than a third predetermined position which is lower than the first predetermined position and the battery discharge limit is at least the predetermined discharge limit.

* * * * *